United States Patent
Terada et al.

(10) Patent No.: US 8,962,205 B2
(45) Date of Patent: Feb. 24, 2015

(54) FUEL CELL STACK

(71) Applicant: Honda Motor Co., Ltd., Tokyo (JP)

(72) Inventors: Eri Terada, Wako (JP); Kazuya Sasamoto, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 65 days.

(21) Appl. No.: 13/773,641

(22) Filed: Feb. 22, 2013

(65) Prior Publication Data

US 2013/0230785 A1  Sep. 5, 2013

(30) Foreign Application Priority Data

Mar. 2, 2012 (JP) ................................. 2012-046851

(51) Int. Cl.
*H01M 2/10* (2006.01)
*H01M 8/04* (2006.01)

(52) U.S. Cl.
CPC ...... *H01M 8/04007* (2013.01); *H01M 8/04201* (2013.01); *Y02E 60/50* (2013.01); *Y02E 60/521* (2013.01)
USPC ........................................................ 429/434

(58) Field of Classification Search
None
See application file for complete search history.

(56) References Cited

U.S. PATENT DOCUMENTS

2005/0202777 A1 * 9/2005 Worland ....................... 454/339

FOREIGN PATENT DOCUMENTS

| JP | 2003-331905 | 11/2003 |
|---|---|---|
| JP | 2005-259427 | 9/2005 |
| JP | 2006-012669 | 1/2006 |
| JP | 2006-049129 | 2/2006 |
| JP | 2006-147511 | 6/2006 |
| JP | 2010-262908 | 11/2010 |

OTHER PUBLICATIONS

Machine Translation of Japanese Patent Publication No. 2006-012669 to Matsumoto et al. obtained from the Japanese Patent Office website on Jun. 17, 2014.*

* cited by examiner

*Primary Examiner* — Patrick Ryan
*Assistant Examiner* — Wyatt McConnell
(74) *Attorney, Agent, or Firm* — Mori & Ward, LLP (57) ABSTRACT

A fuel cell stack includes a stacked body, a first terminal plate, a first insulating plate, a first end plate, and a first insulating collar member. The first insulating collar member includes a first tubular portion and a first flange portion. The first tubular portion is provided in the first fluid manifold hole. The first flange portion is disposed at one end of the first tubular portion. Another end of the first tubular portion projects to an outside of the first fluid manifold hole and is in slidably contact with an inner circumferential surface of the first outer manifold member via an outer circumferential surface sealing member. The first flange portion is in contact with the first insulating plate via an end-face sealing member.

5 Claims, 8 Drawing Sheets

FUEL CELL STACK

CROSS-REFERENCE TO RELATED APPLICATIONS

The present application claims priority under 35 U.S.C. §119 to Japanese Patent Application No. 2012-046851, filed Mar. 2, 2012, entitled "Fuel Cell Stack." The contents of this application are incorporated herein by reference in their entirety.

BACKGROUND OF THE INVENTION

1. Field of the Invention

The present disclosure relates to a fuel cell stack.

2. Discussion of the Background

For example, a solid polymer electrolyte fuel cell includes a power generation cell, in which an electrolyte membrane-electrode assembly (MEA) is sandwiched between a pair of separators, the electrolyte membrane-electrode assembly including an electrolyte membrane formed of a polymer ion exchange membrane, and anode and cathode electrodes that are disposed on both sides of the electrolyte membrane. A fuel cell stack, in which a predetermined number (for example, hundreds) of power generation cells are usually stacked, is used as an in-vehicle fuel cell stack, for example.

In the above-described fuel cell, a fuel gas passage for passing a fuel gas to the anode electrode is provided on the surface of one of the separators, and an oxidant gas passage for passing an oxidant gas to the cathode electrode is provided on the surface of the other of the separators. In addition, a cooling medium passage for passing a cooling medium is disposed between adjacent power generation cells or between adjacent cells in a predetermined number of power generation cells along the surface direction of the separators.

In some fuel cells, a fuel gas supply communication hole which supplies a fuel gas to a fuel gas passage, a fuel gas discharge communication hole which discharges a consumed fuel gas from the fuel gas passage, an oxidant gas supply communication hole which supplies an oxidant gas to an oxidant gas passage, an oxidant gas discharge communication hole which discharges a consumed oxidant gas from the oxidant gas passage, a cooling medium supply communication hole which supplies a cooling medium to a cooling-medium passage, and a cooling medium discharge communication hole which discharges a used cooling medium from the cooling medium passage are formed as through holes in the stacking direction, i.e., a so-called internal manifold is formed.

Figure 9:
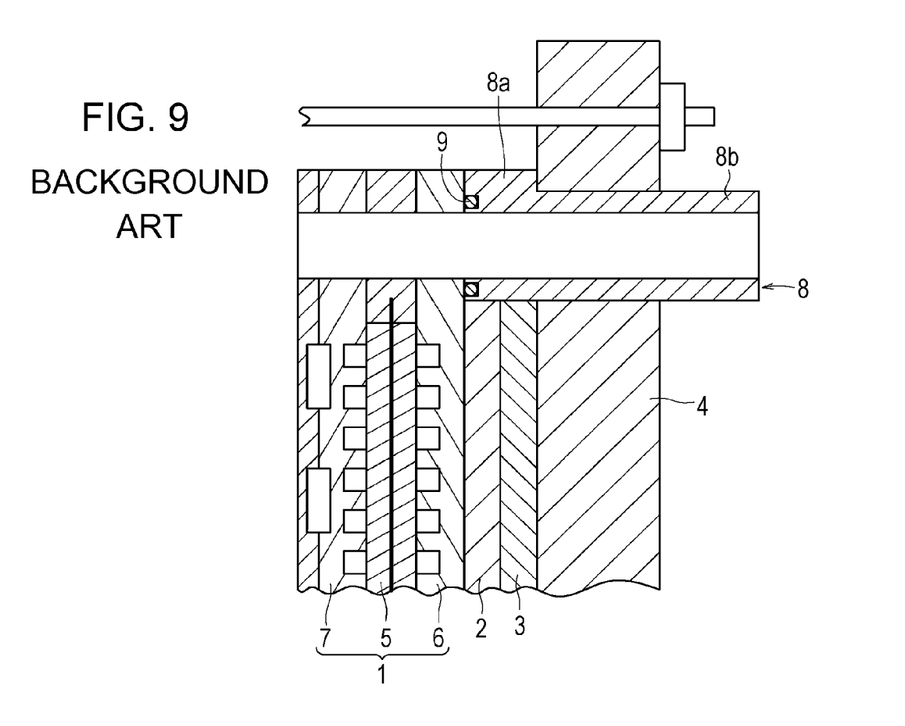
FIG. 9 is a cross-sectional view of the fuel cell which is disclosed in Japanese Unexamined Patent Application Publication No. 2005-259427.

In this type of internal manifold mold fuel cell, a connecting structure for communicating each communication hole to an external manifold member is used in at least one of the end plates. For example, the fuel cell disclosed in Japanese Unexamined Patent Application Publication No. 2005-259427 includes a stacked body of the cells 1 as illustrated in FIG. 9. A terminal 2, an insulator 3, and a pressure plate 4 are disposed at one end of the structure of stacked body of the cells 1.

The cell 1 has a MEA 5, on both sides of which a first separator 6 and a second separator 7 are disposed, respectively. A conduit member 8 has a tube portion 8b which penetrates through a hole of the pressure plate 4, and has a flange 8a on the side of the pressure plate 4 that faces the stacked body. The flange 8a is housed in a housing portion of the terminal 2 and the insulator 3, and is connected via an end-face seal 9 to the stacked body of the cells 1 as a passage.

SUMMARY OF THE INVENTION

According to one aspect of the present invention, a fuel cell stack includes a stacked body, a first terminal plate, a first insulating plate, a first end plate, and a first insulating collar member. The stacked body includes a plurality of fuel cells which are stacked in a stacking direction. Each of the fuel cells includes an electrolyte-electrode assembly and a pair of separators. The electrolyte-electrode assembly has a pair of electrodes and an electrolyte disposed between the pair of electrodes in the stacking direction. The electrolyte-electrode assembly is sandwiched between the pair of separators in the stacking direction. The first terminal plate is provided at a first end of the stacked body in the stacking direction. The first insulating plate is provided at the first end of the stacked body in the stacking direction. The first end plate is provided at the first end of the stacked body in the stacking direction. The first end plate includes a first fluid manifold hole. The first insulating collar member includes a first tubular portion and a first flange portion. One of a cooling medium and a reactant gas is to flow through the first tubular portion to a first outer manifold member in the stacking direction. The first tubular portion is provided in the first fluid manifold hole. The first flange portion is disposed at one end of the first tubular portion. Another end of the first tubular portion projects to an outside of the first fluid manifold hole and is in slidably contact with an inner circumferential surface of the first outer manifold member via an outer circumferential surface sealing member. The first flange portion is in contact with the first insulating plate via an end-face sealing member.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

DESCRIPTION OF THE EMBODIMENTS

The embodiments will now be described with reference to the accompanying drawings, wherein like reference numerals designate corresponding or identical elements throughout the various drawings.

Figure 1:
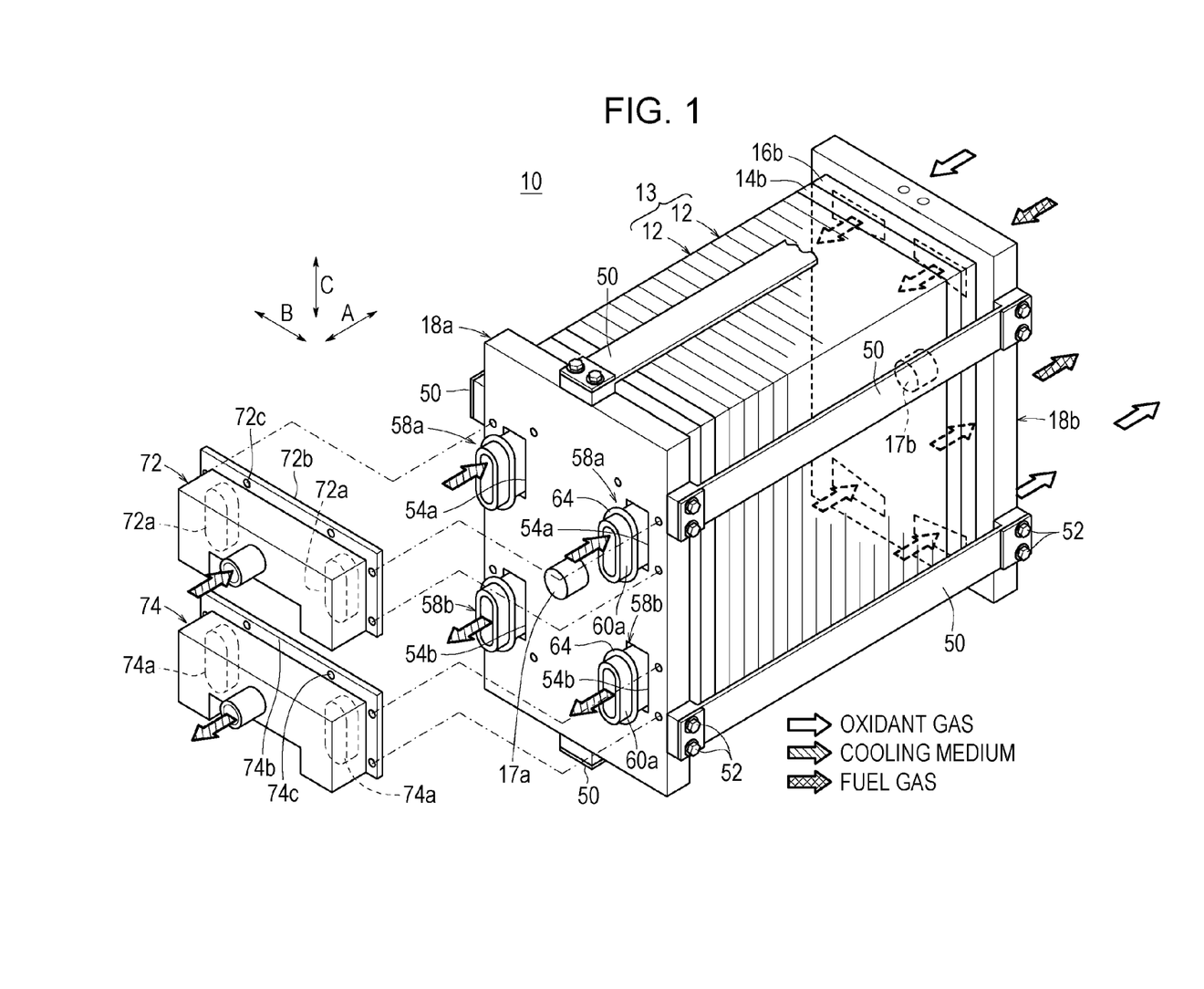
FIG. 1 is a partially exploded perspective view of a fuel cell stack according to a first embodiment of the present disclosure.
Figure 2:
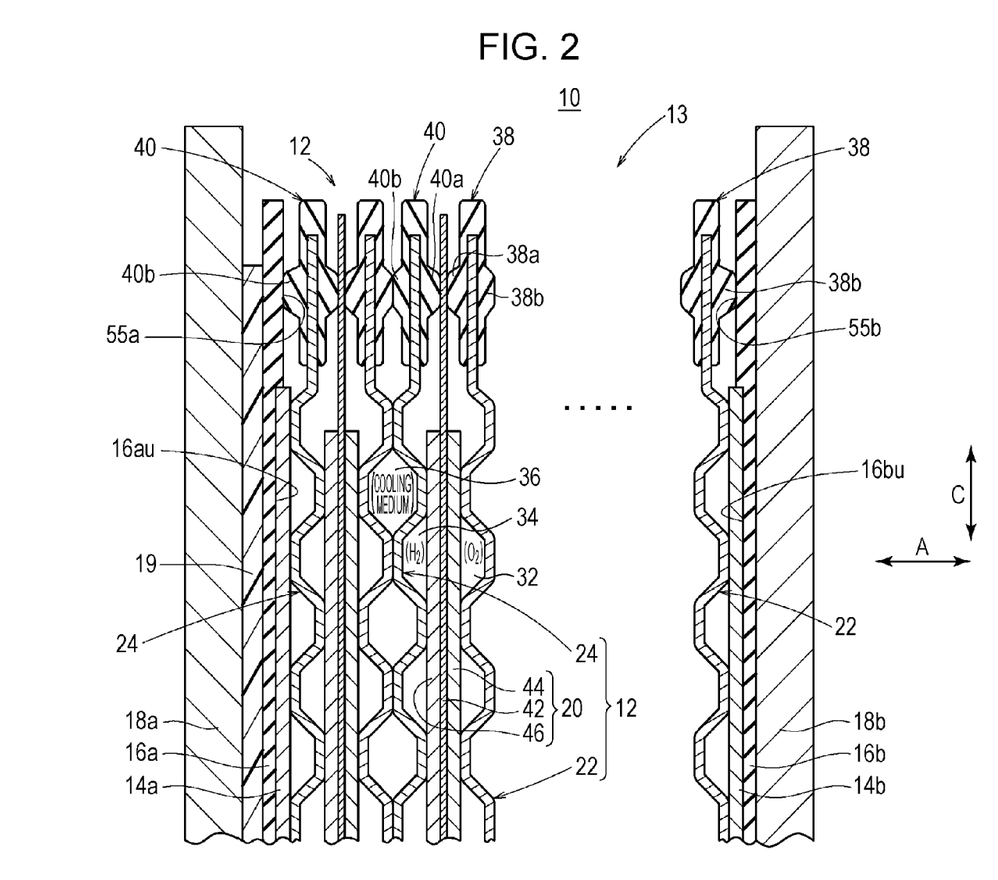
FIG. 2 is a schematic cross-sectional view of the fuel cell stack.

As illustrated in FIGS. 1 and 2, a fuel cell stack 10 according to a first embodiment of the present disclosure serves as an in-vehicle fuel cell stack which is mounted in, for example, a fuel cell vehicle (not illustrated) such as a fuel cell electric vehicle.

The fuel cell stack 10 is a stacked body 13 which is formed by stacking a plurality of fuel cells 12 in an arrow A direction (horizontal direction). It is to be noted that the plurality of fuel cells 12 may be stacked in an arrow C direction (vertical direction). As illustrated in FIG. 2, a terminal plate 14a, an insulating plate 16a, and an end plate 18a are disposed at one end of the stacked body 13 in the stacking direction. A terminal plate 14b, an insulating plate 16b, and an end plate 18b are disposed at the other end of the stacked body 13 in the stacking direction.

Recesses 16au, 16bu are formed in the insulating plates 16a, 16b, and the terminal plates 14a, 14b are housed in the recesses 16au, 16bu. Terminals 17a, 17b respectively extend from the terminal plates 14a, 14b in the stacking direction, and the terminals 17a, 17b are exposed to the outside from the end plates 18a, 18b (see FIG. 1). A thickness adjusting spacer member (shim member) 19 for adjusting a clamping force applied to the stacked body 13 in the stacking direction is interposed between the end plate 18a and the insulating plates 16a (see FIG. 2).

Figure 3:
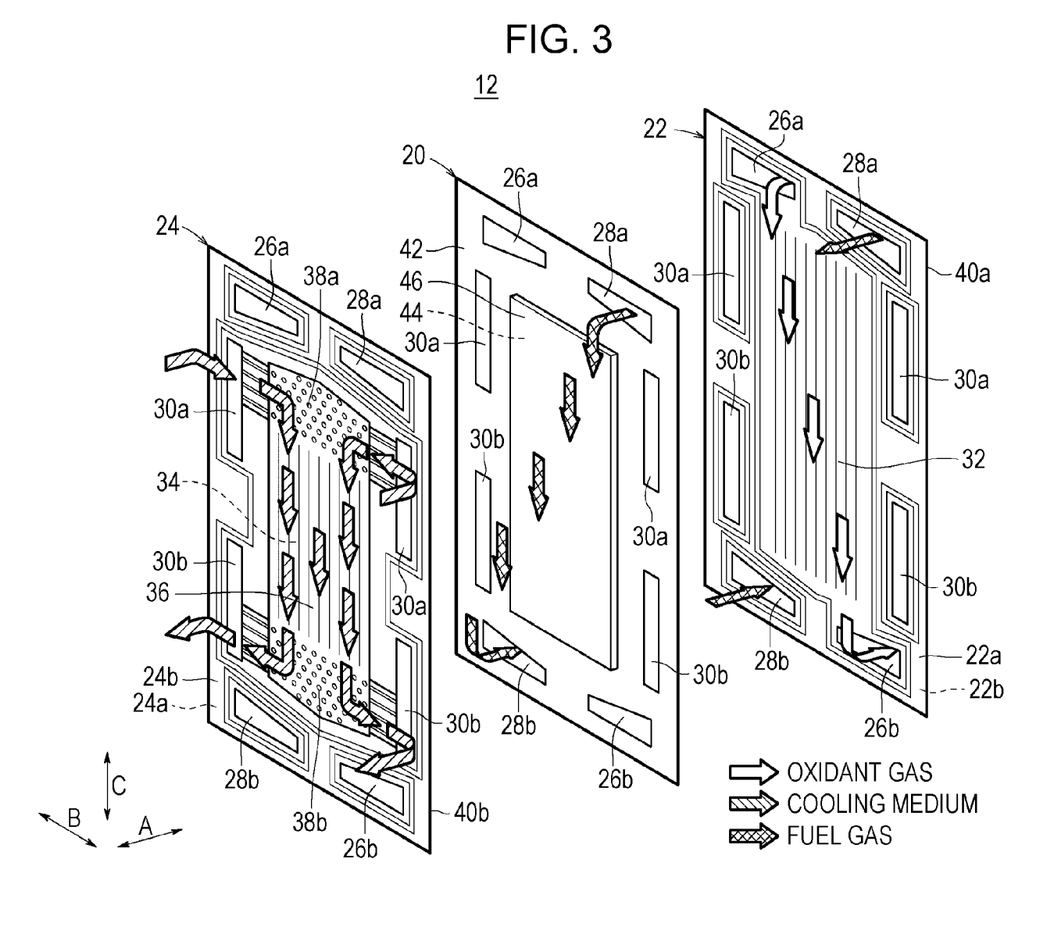
FIG. 3 is an exploded perspective view of the main part of a fuel cell included in the fuel cell stack.

As illustrated in FIG. 3, each fuel cell 12 is formed by sandwiching an electrolyte membrane-electrode assembly (MEA) 20 between a first separator 22 and a second separator 24. The first separator 22 and the second separator 24 having elongated shape are each made of, for example, a steel plate, a stainless steel plate, an aluminum plate, a plated steel plate, or a metal plate received the surface treatment against corrosion. The first separator 22 and the second separator 24 each have a surface which is rectangular and is formed to have a corrugated cross section which is obtained by performing press working on a thin metal plate. It is to be noted that the first separator 22 and the second separator 24 each may be a carbon separator, for example.

At the upper-end of the fuel cells 12 in an arrow C direction (the vertical direction in FIG. 3), an oxidant gas supply communication hole 26a for supplying an oxygen containing gas, for example, an oxidant gas, and a fuel gas supply communication hole 28a for supplying a fuel gas, for example, a hydrogen containing gas are arranged and disposed in the arrow B direction (horizontal direction) so as to communicate with the fuel cells 12 in the arrow A direction which is the stacking direction.

At the lower-end of the fuel cells 12 in the arrow C direction, an oxidant gas discharge communication hole 26b for discharging an oxidant gas, and a fuel gas discharge communication hole 28b for discharging a fuel gas are arranged and disposed in the arrow B direction so as to communicate with the fuel cells 12 in the arrow A direction. The oxidant gas supply communication hole 26a, the oxidant gas discharge communication hole 26b, the fuel gas supply communication hole 28a, and the fuel gas discharge communication hole 28b each have an opening which is approximately triangular (or approximately trapezoidal) in shape, however, the opening is not limited to this, and may be, for example, rectangular, polygonal, oval, or elliptical in shape.

Cooling medium supply communication holes 30a for supplying a cooling medium, and cooling medium discharge communication holes 30b for discharging a cooling medium are respectively disposed, for example, at upper and lower positions of both ends of the fuel cells 12 in the arrow B direction. A pair of the cooling medium supply communication holes 30a, and a pair of the cooling medium discharge communication holes 30b each have an opening which is rectangular in shape, however, the opening is not limited to this, and may be, for example, oval, or elliptical in shape.

A surface 22a of the first separator 22 that faces the electrolyte membrane-electrode assembly 20 is provided with an oxidant gas passage 32 which communicates with the oxidant gas supply communication hole 26a and the oxidant gas discharge communication hole 26b. The oxidant gas passage 32 allows an oxidant gas to flow in the arrow C direction below.

A surface 24a of the second separator 24 that faces the electrolyte membrane-electrode assembly 20 is provided with a fuel gas passage 34 which communicates with the fuel gas supply communication hole 28a and the fuel gas discharge communication hole 28b. The fuel gas passage 34 allows a fuel gas to flow in the arrow C direction below.

When the fuel cells are disposed adjacent each other the space formed between the surface 22b of the first separator 22, and the surface 24b of the second separator 24 is provided for a cooling medium passage 36 which communicates with the cooling medium supply communication hole 30a and the cooling medium discharge communication hole 30b. The cooling medium passage 36 allows a cooling medium to flow in the arrow C direction below, and buffer portions (in an embossed form) 38a, 38b are respectively provided above and below (upstream and downstream) the cooling medium passage 36.

A first sealing member 40a is provided separately or integrally with the surfaces 22a, 22b of the first separator 22, and a second sealing member 40b is provided separately or integrally with the surfaces 24a, 24b of the second separator 24. As the material for the first sealing member 40a and the second sealing member 40b, a sealing material, a cushioning material, or a packing material, such as EPDM, NBR, a fluoride rubber, a silicone rubber, a fluoro silicone rubber, a butyl rubber, a natural rubber, a styrene rubber, a chloroprene or acrylic rubber is used.

The electrolyte membrane-electrode assembly 20 includes, for example, a solid polymer electrolyte membrane 42 which is a thin perfluoro sulfonic acid membrane impregnated with water, and a cathode electrode 44 and an anode electrode 46 between which the solid polymer electrolyte membrane 42 is sandwiched.

The cathode electrode 44 and the anode electrode 46 each have a gas diffusion layer which is formed of carbon paper or the like, and an electrode catalyst layer which is formed by uniformly coating the surface of the gas diffusion layer with porous carbon particles which carry platinum alloy on the surfaces thereof. The electrode catalyst layer is formed on the both sides of the solid polymer electrolyte membrane 42.

As illustrated in FIG. 1, a plurality of connecting members 50 are spanned between the end plate 18a and the end plate 18b. The connecting member 50 has a elongated plate shape, and two pieces of the connecting member 50 are disposed on each of the longer side surfaces of the fuel cell stack 10, and one piece of the connecting member 50 is disposed on each of the shorter side surfaces of the fuel cell stack 10. Both ends of the connecting members 50 in the arrow A direction are fixed to the lateral sides of the end plate 18a and the end plate 18b by bolts 52.

A predetermined fastening load is applied between the end plates 18a and 18b in the stacking direction, and the distance between the end plates 18a and 18b is maintained at a constant value.

Figure 4:
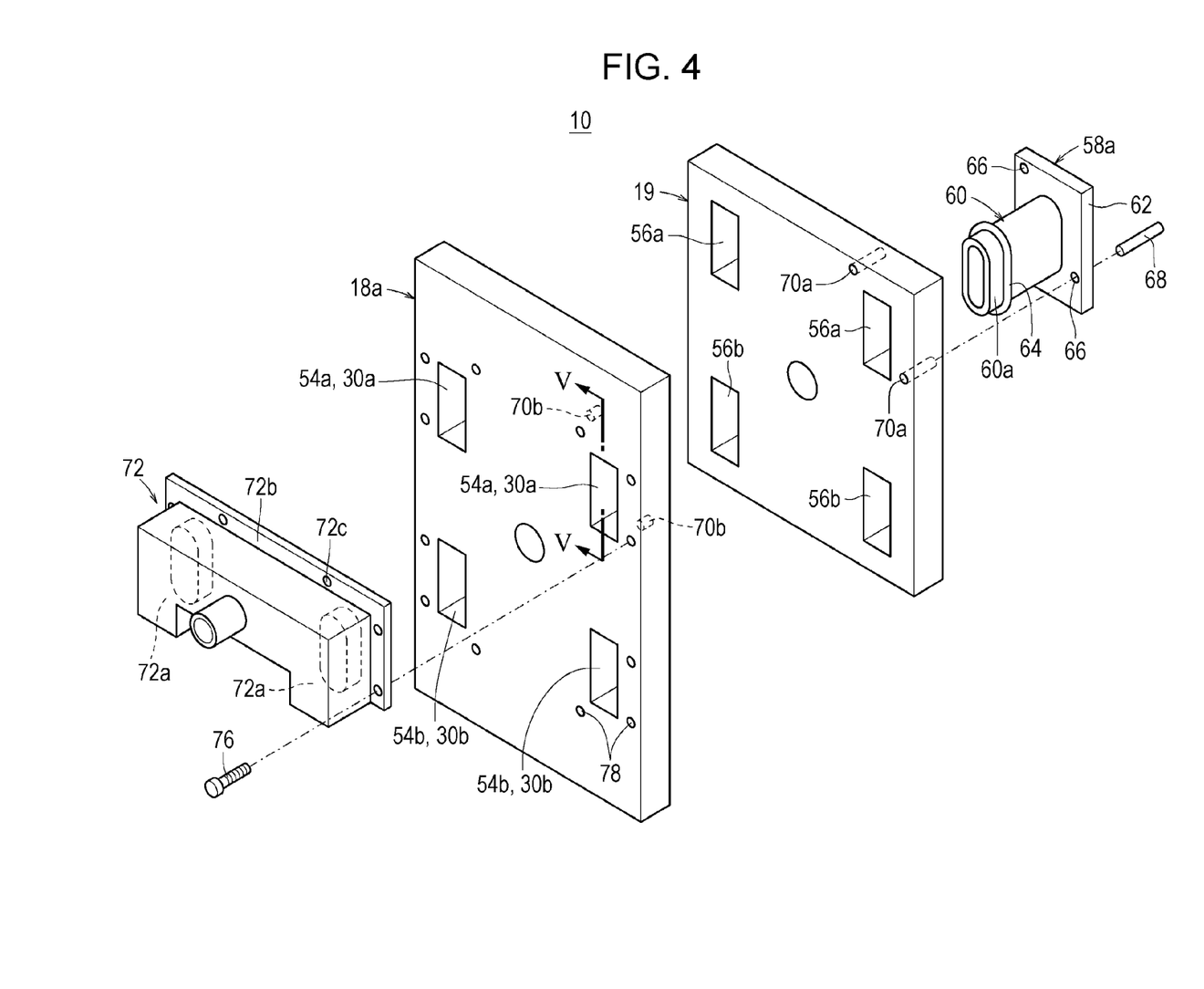
FIG. 4 is an exploded perspective view of the main part of the vicinity of one end plate included in the fuel cell stack.

As illustrated in FIG. 4, a cooling medium supply manifold hole (fluid manifold hole) 54a which communicates with a pair of the cooling medium supply communication holes 30a, and a cooling medium discharge manifold hole (fluid manifold hole) 54b which communicates with a pair of the cooling medium discharge communication hole 30b are formed in the end plate 18a. Similarly, a pair of the cooling medium supply manifold hole 56a and a pair of the cooling medium discharge manifold hole 56b are formed in the spacer member 19.

As illustrated in FIGS. 1 and 4, in the end plate 18a and spacer member 19, an insulating collar member 58a is arranged to be inserted through in the cooling medium supply manifold holes 54a, 56a, and an insulating collar member 58b is arranged to be integrally inserted in the cooling medium discharge manifold holes 54b, 56b.

Figure 5:
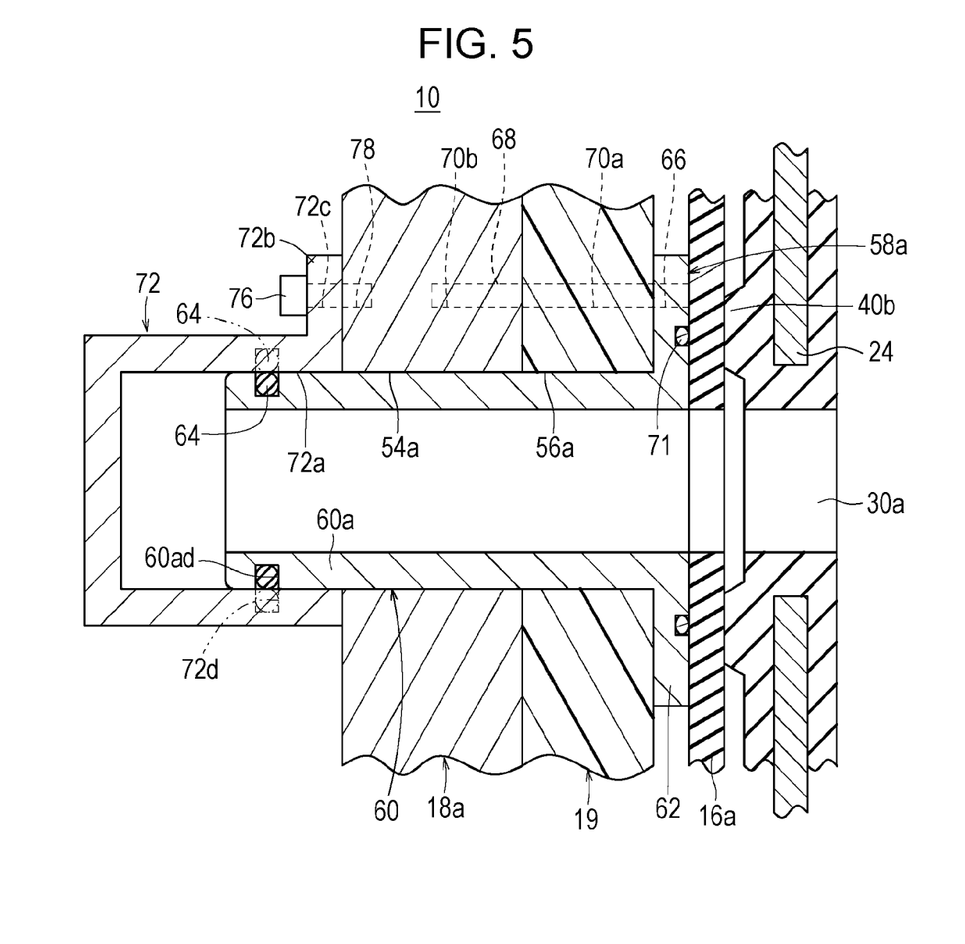
FIG. 5 is a cross-sectional view of the vicinity of the one end plate, taken along a line V-V in FIG. 4.

As illustrated in FIGS. 4 and 5, the insulating collar member 58a integrally has a tubular portion 60 to be inserted in the cooling medium supply manifold holes 54a, 56a, and a flange portion 62 with a large dimension provided at one end of the tubular portion 60. The tubular portion 60 has an oval shape or an elliptical shape corresponding to the inner shape of the cooling medium supply manifold holes 54a, 56a, and is disposed with a space secured in the cooling medium supply manifold holes 54a, 56a. It is to be noted that the tubular portion 60 may be in direct contact with the inner surface of the cooling medium supply manifold holes 54a, 56a.

An front end 60a of the tubular portion 60 is exposed to the outside from the outer surface of the end plate 18a, and an O-ring (outer circumferential surface sealing member) 64, which is a radial seal, is arranged and disposed along a circumferential groove 60ad on the outer circumference of the front end 60a. The O-ring 64 has an oval shape or an elliptical shape. It is to be noted that the O-ring 64 may be disposed in, for example, a groove 72d which is formed on the inner circumferential surface of the below-described cooling medium supply manifold 72 (see FIG. 5).

At least one, for example, two positioning holes 66 are formed in the flange portion 62. A positioning pin 68 is inserted in each of the positioning holes 66, and is inserted through in a positioning hole 70a and a positioning hollow 70b which are respectively formed in the spacer member 19 and the end plate 18a. An end-face seal 71 may be provided between the end face of the flange portion 62 and the insulating plate 16a.

As illustrated in FIG. 5, the flange 62 of the insulating collar member 58a is in contact with the end face of the spacer member 19, and is pressed and held against the insulating plate 16a, for example, by the second sealing member (end face sealing member) 40b of the second separator 24.

The insulating collar member 58b is formed similarly to the above-described insulating collar member 58a. The same components are labeled with the same reference symbols, and detailed description thereof are omitted.

As illustrated in FIG. 1, a cooling medium supply manifold (outer manifold member) 72, and a cooling medium discharge manifold (outer manifold member) 74 are respectively disposed at upper and lower positions of the end plate 18a.

The cooling medium supply manifold 72 has a downward U shape, and on both right and left ends, connecting holes 72a are respectively provided, in each of which the front end 60a of the tubular portion 60 provided in the insulating collar member 58a fits. The connecting hole 72a has an opening with an oval or elliptical cross section, and the inner circumferential surface of the connecting hole 72a is in contact with the O-ring 64, and thus the tubular portion 60 is slidably disposed (see FIG. 5) against the connecting hole 72a.

A screw 76 is inserted in a hole 72c which is formed in a flange portion 72b provided on the outer circumference of the cooling medium supply manifold 72, and the end of the screw 76 is screwed in a tapped hole 78 formed in the end plate 18a (see FIGS. 4 and 5).

Similarly to the cooling medium supply manifold 72, the cooling medium discharge manifold 74 is provided with connecting holes 74a, in each of which the front end 60a of the tubular portion 60 provided in the insulating collar member 58b fits as illustrated in FIG. 1. A screw 76 is inserted in a hole 74c which is formed in a flange portion 74b provided on the outer circumference of the cooling medium discharge manifold 74, and the end of the screw 76 is screwed in a tapped hole 78 formed in the end plate 18a.

Figure 6:
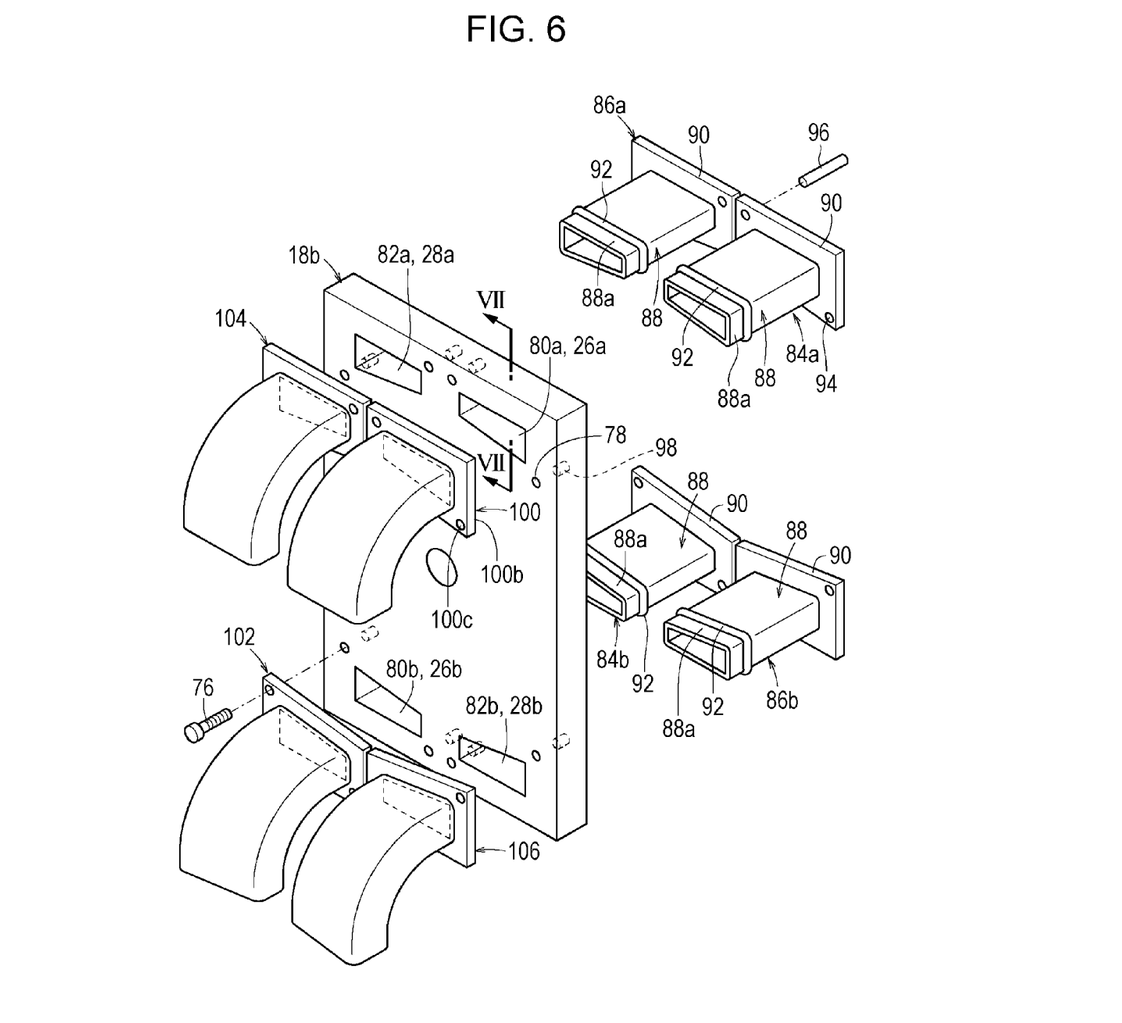
FIG. 6 is an exploded perspective view of the main part of the vicinity of the other end plate included in the fuel cell stack.

As illustrated in FIG. 6, in the end plate 18b, there are formed an oxidant gas supply manifold hole (fluid manifold hole) 80a which communicates with the oxidant gas supply communication hole 26a, an oxidant gas discharge manifold hole (fluid manifold hole) 80b which communicates with the oxidant gas discharge communication hole 26b, a fuel gas supply manifold hole (fluid manifold hole) 82a which communicates with the fuel gas supply communication hole 28a, and a fuel gas exhaust manifold hole (fluid manifold hole) 82b which communicates with the fuel gas discharge communication hole 28b.

The oxidant gas supply manifold hole 80a, the oxidant gas discharge manifold hole 80b, the fuel gas supply manifold hole 82a, and the fuel gas exhaust manifold hole 82b are approximately triangular (or approximately trapezoidal) in shape.

In the end plate 18b, insulating collar members 84a and 84b are arranged to be inserted in the oxidant gas supply manifold hole 80a and the oxidant gas discharge manifold hole 80b, respectively, and insulating collar members 86a and 86b are arranged to be inserted in the fuel gas supply manifold hole 82a and the fuel gas exhaust manifold hole 82b, respectively.

Figure 7:
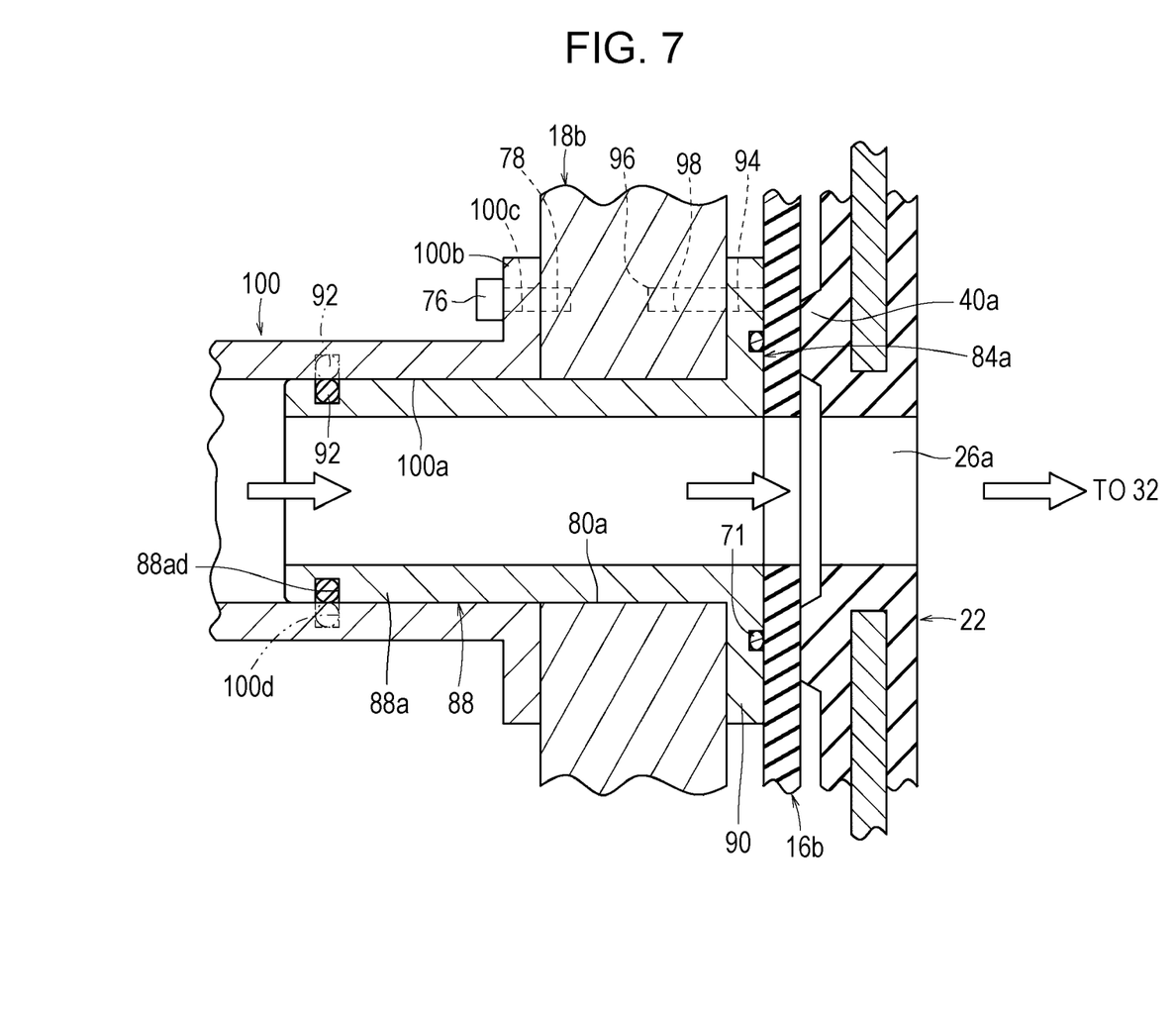
FIG. 7 is a cross-sectional view of the vicinity of the other end plate, taken along a line VII-VII in FIG. 6.

As illustrated in FIGS. 6 and 7, the insulating collar member 84a integrally has a tubular portion 88 to be inserted in the oxidant gas supply manifold hole 80a, and a flange portion 90 with a larger dimension provided at one end of the tubular portion 88. The tubular portion 88 has an approximately triangular shape (or an approximately trapezoidal shape) corresponding to the inner shape of the oxidant gas supply manifold hole 80a, and is disposed with a space secured in the oxidant gas supply manifold hole 80a. It is to be noted that the tubular portion 88 may be in direct contact with the inner surface of the oxidant gas supply manifold hole 80a.

An front end 88a of the tubular portion 88 is exposed to the outside from the outer surface of the end plate 18b, and an O-ring (outer circumferential surface sealing member) 92, which is a radial seal, is arranged and disposed along a circumferential groove 88ad on the outer circumference of the front end 88a. The O-ring 92 has an approximately triangular shape or an approximately trapezoidal shape. It is to be noted that the O-ring 92 may be disposed in, for example, a groove 100d which is formed on the inner peripheral surface of the below-described oxidant gas supply manifold 100 (see FIG. 7).

At least one, for example, two positioning holes 94 are formed in the flange portion 90. A positioning pin 96 is inserted in each of the positioning holes 94, and is inserted in a positioning hollow 98 which is formed in the end plate 18b. As illustrated in FIG. 7, the flange 90 of the insulating collar member 84a is in contact with the end surface of the end plate 18b, and is pressed and held, for example, by the first sealing member (end face sealing member) 40a of the first separator 22.

The insulating collar member 84b, 86a, 86b are formed similarly to the above-described insulating collar member 84a, and the same components are labeled with the same reference symbols, and detailed description thereof are omitted.

In the end plate 18b, there are disposed an oxidant gas supply manifold (outer manifold member) 100, an oxidant gas discharge manifold (outer manifold member) 102, a fuel gas supply manifold (outer manifold member) 104, and a fuel gas exhaust manifold (outer manifold member) 106.

As illustrated in FIG. 7, the oxidant gas supply manifold 100 is provided with a connecting hole 100a, in which the front end 88a of the tubular portion 88 provided in the insulating collar member 84b fits. The connecting hole 100a has an opening with an approximately triangular (or approximately trapezoidal) cross section, and the inner circumferential surface of the connecting hole 100a is in contact with the O-ring 92, and thus the tubular portion 88 is slidably disposed against the connection hole 100a.

The screw 76 is inserted in a hole 100c which is formed in a flange portion 100b provided on the outer circumference of the oxidant gas supply manifold 100, and the end of the screw 76 is screwed in the tapped hole 78 formed in the end plate 18b.

The oxidant gas discharge manifold 102, the fuel gas supply manifold 104, and the fuel gas exhaust manifold 106 are formed similarly to the above-described oxidant gas supply manifold 100, and detailed description thereof are omitted.

The operation of the fuel cell stack 10 with the above configuration will be described hereinafter.

First, an oxidant gas such as an oxygen containing gas is supplied to the oxidant gas supply manifold 100 of the end plate 18b as illustrated in FIGS. 6 and 7, and a fuel gas such as a hydrogen containing gas is supplied to the fuel gas supply manifold 104 as illustrated in FIG. 6. In addition, a cooling medium such as pure water, ethylene glycol, or oil is supplied to the cooling medium supply manifold 72 of the end plate 18a as illustrated in FIG. 1.

Thus, as illustrated in FIG. 7, an oxidant gas is introduced into the oxidant gas passage 32 of the first separator 22 from the insulating collar member 84a through the oxidant gas supply communication hole 26a. As illustrated in FIG. 3, the oxidant gas, while moving in the arrow C direction along the oxidant gas passage 32, is supplied to the cathode electrode 44 included in the electrolyte membrane-electrode assembly 20.

On the other hand, a fuel gas is introduced into the fuel gas passage 34 of the second separator 24 from the insulating collar member 86a through the fuel gas supply communication hole 28a as illustrated in FIG. 6 (see FIG. 3). The fuel gas, while moving in the arrow C direction along the fuel gas passage 34, is supplied to the anode electrode 46 included in the electrolyte membrane-electrode assembly 20.

Consequently, in the electrolyte membrane-electrode assembly 20, the oxidant gas supplied to the cathode electrode 44 and the fuel gas supplied to the anode electrode 46 are consumed by an electrochemical reaction in an electrode catalyst layer, and thus electric power is generated.

Subsequently, the oxidant gas which has been supplied to the cathode electrode 44 and consumed is discharged in the arrow A direction along the oxidant gas discharge communication hole 26b. On the other hand, the fuel gas which has been supplied to the anode electrode 46 and consumed is discharged in the arrow A direction along the fuel gas discharge communication hole 28b.

As illustrated in FIGS. 1 and 3, a cooling medium is supplied from the insulating collar member 58a to the cooling medium supply communication hole 30a, and is introduced into the cooling medium passage 36 between the first separator 22 and the second separator 24 and flows in the arrow C direction. The cooling medium, after cooling the electrolyte membrane-electrode assembly 20, is discharged into the cooling medium discharge communication hole 30b.

In the above case in the first embodiment, for example, as illustrated in FIG. 5, the insulating collar member 58a is inserted in the cooling medium supply manifold hole 54a, and the tubular portion 60 included in the insulating collar member 58a is in slidably contact with the inner circumferential surface of the cooling medium supply manifold (outer manifold member) 72 via the outer circumferential surface sealing member, i.e., the O-ring (radial seal) 64.

Thus, with the adjustment of the thickness of the spacer member 19, even when a positional variation in the stacking direction occurs inside the fuel cell stack 10, the inner circumferential surfaces of the tubular portion 60 and the cooling medium supply manifold 72 are self-adjustable for the positional variation because of the sliding effect of the O-ring 64.

Therefore, a plurality of insulating collar members 58a with different dimensions do not need to be produced each time when the thickness of spacing member 19 varies, for example. Consequently, the following effect is obtained: a desired sealing capability can be achieved by using a single insulating collar member 58a which can be favorably mounted to the end plate 18a, in a simple and cost effective configuration.

It is to be noted that the effect similar to that of the above-described insulating collar member 58a may be obtained using other insulating collar members 58b, 84a, 84b, 86a, and 86b.

Figure 8:
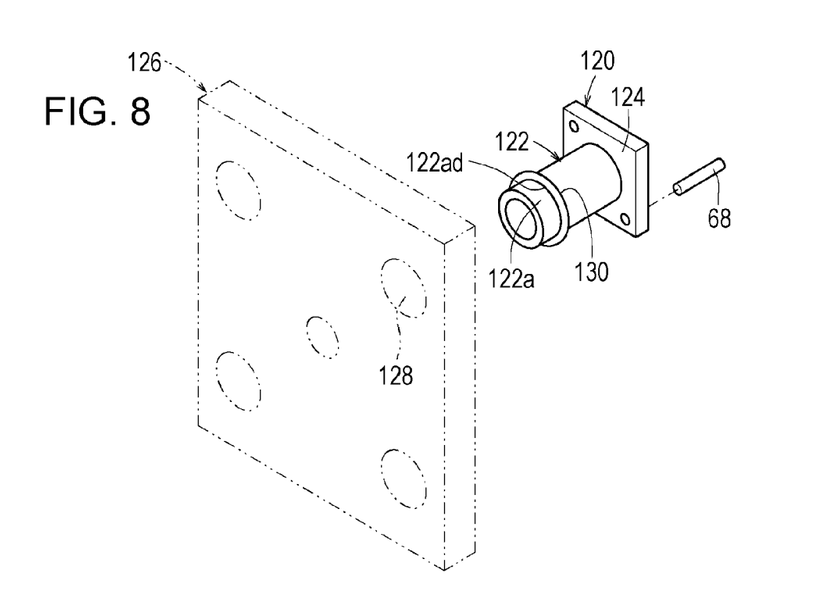
FIG. 8 is a perspective view of an insulating collar member included in a fuel cell stack according to a second embodiment of the present disclosure.

FIG. 8 is a perspective view of an insulating collar member 120 included in a fuel cell stack according to a second embodiment of the present disclosure.

The insulating collar member 120 integrally has a tubular portion 122, and a flange portion 124 with a larger dimension provided at one end of the tubular portion 122. The tubular portion 122 has a circular cross-sectional shape corresponding to the circular cross-sectional shape of the fluid manifold hole 128 of the end plate 126.

An front end 122a of the tubular portion 122 is exposed to the outside from the end surface of the end plate 126, and an O-ring (outer circumferential surface sealing member) 130, which is a radial seal, is arranged and disposed along a circumferential groove 122ad on the outer circumference of the front end 122a. The O-ring 130 has a circular shape. It is to be noted that the O-ring 130 may be provided on a groove (not illustrated) which is formed along the inner circumferential surface of the fluid manifold hole 128.

In the second embodiment having the above configuration, the O-ring 130, which is a radial seal, is disposed outwardly of the tubular portion 122 of the insulating collar member 120. Therefore, the effect similar to that of the above-described fuel cell stack 10 according to the first embodiment is obtained. It is to be noted that in the first and second embodiments, the insulating collar members 58a, 58b in an oval shape (elliptical shape), the insulating collar members 84a, 84b, 86a, and 86b in an approximately triangular shape (or approximately trapezoidal shape), and the insulating collar member 120 in a circular shape are used, however, the shapes of the insulating collar members are not limited to the above shapes.

A fuel cell stack according to the embodiment includes: a stacked body in which a plurality of fuel cells are stacked, each of the fuel cells including an electrolyte-electrode assembly having an electrolyte and a pair of electrodes being disposed on both sides of the electrolyte, and a pair of separators between which the electrolyte-electrode assembly is sandwiched; a pair of terminal plates; a pair of insulating plates; a pair of end plates; and an insulating collar member. Both ends of the stacked body in the stacking direction are respectively provided with the terminal plates, the insulating plates, and the end plates, and a fluid manifold hole is formed in at least one of the end plates, the fluid manifold hole for supplying or discharging, to an outer manifold member, a cooling medium or a reactant gas which flows in the stacking direction.

The fuel cell stack according to the embodiment includes an insulating collar member which is disposed to a fluid manifold hole, and the insulating collar member has a tubular portion to be inserted in the fluid manifold hole, and a flange portion to be disposed at one end of the tubular portion. The flange portion is in contact with an insulating plate via an end-face sealing member, and the other end of the tubular portion projects to the outside of the fluid manifold hole, and is in slidably contact with the inner circumferential surface of an outer manifold member via an outer circumferential surface sealing member. Thus, even when a positional variation in the stacking direction occurs inside the fuel cell stack, the inner circumferential surfaces of the tubular portion and the outer manifold member are self-adjustable for the positional variation because of a sliding effect of the outer circumferential surface sealing member. Consequently, a plurality of insulating collar members with different dimensions do not need to be produced, and an insulating collar member has a desired sealing capability and can be favorably mounted to an end plate in a simple and cost effective configuration.

In the fuel cell stack according to the embodiment, a spacer member which adjusts the thickness of the fuel cell stack in the stacking direction is preferably interposed between the end plate and the insulating plate.

Obviously, numerous modifications and variations of the present invention are possible in light of the above teachings. It is therefore to be understood that within the scope of the appended claims, the invention may be practiced otherwise than as specifically described herein.

What is claimed is:

1. A fuel cell stack comprising:
   a stacked body including a plurality of fuel cells which are stacked in a stacking direction, each of the fuel cells comprising:
      an electrolyte-electrode assembly having a pair of electrodes and an electrolyte disposed between the pair of electrodes in the stacking direction; and
      a pair of separators between which the electrolyte-electrode assembly is sandwiched in the stacking direction;
   a first terminal plate provided at a first end of the stacked body in the stacking direction;
   a first insulating plate provided at the first end of the stacked body in the stacking direction;
   a first end plate provided at the first end of the stacked body in the stacking direction, the first end plate including a first fluid manifold hole;
   a first outer manifold member fixed to the first end plate;
   a first insulating collar member comprising:
      a first tubular portion through which one of a cooling medium and a reactant gas is to flow to the first outer manifold member in the stacking direction, the first tubular portion being provided in the first fluid manifold hole; and
      a first flange portion disposed at one end of the first tubular portion, another end of the first tubular portion projecting to an outside of the first fluid manifold hole and being in slidable contact with an inner circumferential surface of the first outer manifold member via an outer circumferential surface sealing member, the first flange portion being in direct contact with the first insulating plate and is sealed thereto via an end-face sealing member; and
   a first spacer member provided between the first end plate and the first insulating plate to adjust a thickness of the fuel cell stack in the stacking direction.

2. The fuel cell stack according to claim 1, further comprising:
   a second terminal plate provided at a second end of the stacked body in the stacking direction, the second end being opposite to the first end with respect to the stacked body in the stacking direction;
   a second insulating plate provided at the second end of the stacked body in the stacking direction; and
   a second end plate provided at the second end of the stacked body in the stacking direction.

3. The fuel cell stack according to claim 2, further comprising:
   a second spacer member provided between the second end plate and the second insulating plate to adjust a thickness of the fuel cell stack in the stacking direction.

4. The fuel cell stack according to claim 2, wherein the second end plate includes a second fluid manifold hole.

5. The fuel cell stack according to claim 4, further comprising:
   a second insulating collar member comprising:
      a second tubular portion through which one of a cooling medium and a reactant gas is to flow to a second outer manifold member in the stacking direction, the second tubular portion being provided in the second fluid manifold hole; and
      a second flange portion disposed at one end of the second tubular portion, another end of the second tubular portion projecting to an outside of the second fluid manifold hole and being in slidably contact with an inner circumferential surface of the second outer manifold member via an outer circumferential surface sealing member, the second flange portion being in contact with the second insulating plate via an end-face sealing member.

* * * * *